United States Patent
Wang et al.

(10) Patent No.: US 12,436,673 B2
(45) Date of Patent: Oct. 7, 2025

(54) INTERFACE FOR RECORDING REAL-TIME INTERACTION

(71) Applicant: Beijing Zitiao Network Technology Co., Ltd., Beijing (CN)

(72) Inventors: Zhe Wang, Beijing (CN); Guangliang Ma, Beijing (CN); Siri Hu, Beijing (CN); Peng Wang, Beijing (CN); Wenwen Huang, Beijing (CN); Jianping Jin, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/543,863

(22) Filed: Dec. 18, 2023

(65) Prior Publication Data
US 2024/0118799 A1    Apr. 11, 2024

Related U.S. Application Data

(63) Continuation of application No. PCT/CN2022/118179, filed on Sep. 9, 2022.

(30) Foreign Application Priority Data

Sep. 23, 2021 (CN) .......................... 202111116910.2

(51) Int. Cl.
*G06F 3/04847* (2022.01)
*G06F 3/04845* (2022.01)

(52) U.S. Cl.
CPC ...... *G06F 3/04847* (2013.01); *G06F 3/04845* (2013.01)

(58) Field of Classification Search
None
See application file for complete search history.

(56) References Cited

U.S. PATENT DOCUMENTS 9,001,180 B2 *  4/2015  Calman ................. H04N 7/155
                                                       348/14.09
9,553,841 B1 *  1/2017  Skinner ............... H04L 12/1895
(Continued)

FOREIGN PATENT DOCUMENTS

CN          107124573 A         9/2017
CN          107566892 A         1/2018
(Continued)

OTHER PUBLICATIONS

International Search Report and Written Opinion for International Application No. PCT/CN2022/118179, mailed Nov. 24, 2022, 11 Pages.
(Continued)

*Primary Examiner* — Henry Orr

(57) ABSTRACT

This article discloses an interaction method and apparatus, and electronic device and medium. The interaction method comprises: displaying an interaction interface after a user selects an interactive object via a selection interface and the interactive object receives an interaction invitation, wherein the interaction interface is configured to display pictures taken by the user and the interactive object in real time, the interaction interface comprises an interaction control for the user and the interactive object to interact while capturing in real time, the selection interface and the interaction interface are video capturing related interfaces, the video capturing related interfaces are related to capturing of an interactive video, and the interactive video is a video which is taken while the user and the interactive object interacts based on the interaction interface; obtaining a setting operation for the interaction control; and responding to the setting operation within the interaction interface.

13 Claims, 5 Drawing Sheets

(56) References Cited

U.S. PATENT DOCUMENTS

| | | | |
|---|---|---|---|
| 10,850,204 B2 * | 12/2020 | Bruzzo | A63F 13/32 |
| 11,606,597 B2 * | 3/2023 | Iyer | H04N 21/2187 |
| 2007/0126859 A1 | 6/2007 | Choi et al. | |
| 2009/0192845 A1 * | 7/2009 | Gudipaty | G06F 3/0482 |
| | | | 715/733 |
| 2011/0249081 A1 * | 10/2011 | Kay | H04M 7/003 |
| | | | 348/14.03 |
| 2014/0025778 A1 * | 1/2014 | Nguyen | H04L 51/212 |
| | | | 709/217 |
| 2014/0108288 A1 * | 4/2014 | Calman | H04N 7/155 |
| | | | 705/342 |
| 2016/0299658 A1 * | 10/2016 | Langholz | G06F 3/0484 |
| 2018/0146223 A1 * | 5/2018 | Kedenburg, III | |
| | | | H04N 21/44008 |
| 2018/0152736 A1 | 5/2018 | Alexander | |
| 2021/0400142 A1 * | 12/2021 | Jorasch | H04L 65/1069 |
| 2022/0020396 A1 * | 1/2022 | Khan | G11B 27/3036 |

FOREIGN PATENT DOCUMENTS

| | | |
|---|---|---|
| CN | 108810576 A | 11/2018 |
| CN | 109756747 A | 5/2019 |
| CN | 111083420 A | 4/2020 |
| CN | 107551544 B | 11/2020 |
| JP | 2015-529031 A | 10/2015 |
| JP | 2019-197520 A | 11/2019 |
| JP | 2020-017868 A | 1/2020 |
| JP | 2021-086626 A | 6/2021 |
| WO | 2014/128616 A2 | 8/2014 |

OTHER PUBLICATIONS

Office action received from Japanese patent application No. 2023-578702 mailed on Dec. 10, 2024, 7 pages (4 pages English Translation and 3 pages Original Copy).

* cited by examiner

INTERFACE FOR RECORDING REAL-TIME INTERACTION

The present application is a continuation of International Patent Application No. PCT/CN2022/118179, filed on Sep. 9, 2022, which claims priority to Chinese Patent Application No. 202111116910.2 filed on Sep. 23, 2021, both of which is incorporated herein by reference in their entireties.

FIELD

The present disclosure relates to the field of computers, for example, to an interaction method and apparatus, and electronic device and medium.

BACKGROUND

With the continuous enrichment of applications, short videos have emerged. More and more users are using short videos, and various functions in short videos are becoming richer.

Short video capturing is mostly done with a single device, lacking real-time interaction between users.

SUMMARY

The present disclosure provides an interaction method and apparatus and electronic device and medium for achieving real-time interaction between users within an application, thereby improving the interactivity between users within the application.

The present disclosure provides an interaction method, comprising: displaying an interaction interface after a user selects an interactive object via a selection interface and the interactive object receives an interaction invitation, wherein the interaction interface is configured to display pictures taken by the user and the interactive object in real time, the interaction interface comprises an interaction control for the user and the interactive object to interact while capturing in real time, the selection interface and the interaction interface are video capturing related interfaces, the video capturing related interfaces are related to capturing of an interactive video, and the interactive video is a video which is taken while the user and the interactive object interacts based on the interaction interface; obtaining a setting operation for the interaction control; and responding to the setting operation within the interaction interface.

The present disclosure provides an apparatus for interaction, comprising: a display module configured to display an interaction interface after a user selects an interactive object via a selection interface and the interactive object receives an interaction invitation, wherein the interaction interface is configured to display pictures taken by the user and the interactive object in real time, the interaction interface comprises an interaction control for the user and the interactive object to interact while capturing in real time, the selection interface and the interaction interface are video capturing related interfaces, the video capturing related interfaces are related to capturing of an interactive video, and the interactive video is a video which is taken while the user and the interactive object interacts based on the interaction interface; a setting operation obtaining module configured to obtain a setting operation for the interaction control; and a responding module configured to respond to the setting operation within the interaction interface.

The present disclosure also provides an electronic device, comprising: one or more processing devices; a storage configured to store one or more programs. The one or more programs, when executed by the one or more processing devices, causes the one or more processing devices to implement the above method for interaction.

The present disclosure also provides a computer-readable medium having a computer program stored thereon, which implements the above-described method of interaction when executed by a processing device.

DETAILED DESCRIPTION

Figure 1:
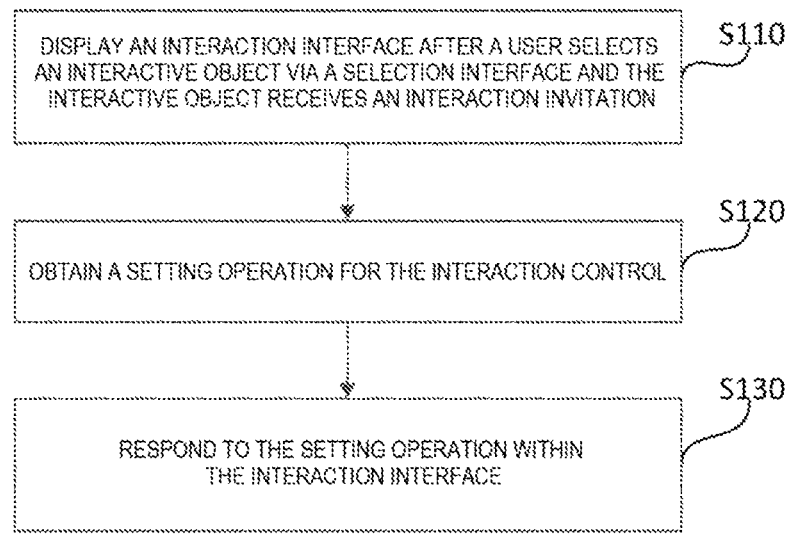
FIG. 1 is a schematic flowchart of a method of interaction according to an embodiment of the present disclosure.

The following will describe embodiments of the present disclosure with reference to the accompanying drawings. Although some embodiments of the present disclosure are shown in the drawings, the present disclosure can be implemented in various forms, and these embodiments are provided to understand the present disclosure. The accompanying drawings and embodiments of the present disclosure are for illustrative purposes only.

A plurality of steps described in the method implementation method of this disclosure can be executed in different orders and/or in parallel. In addition, the method implementation method can include additional steps and/or omit the steps shown. The scope of this disclosure is not limited in this regard.

The term "including" and its variations used in this article are open-ended, i.e. "including but not limited to". The term "based on" means "at least partially based on". The term "one embodiment" means "at least one embodiment"; the term "another embodiment" means "at least one additional embodiment"; the term "some embodiments" means "at least some embodiments". Relevant definitions of other terms will be given in the following description.

The concepts of "first" and "second" mentioned in this disclosure are only used to distinguish different devices, modules, or units, and are not used to limit the order or interdependence of the functions performed by these devices, modules, or units.

The modifications of "one" and "a/the plurality of" mentioned in this disclosure are illustrative and not restrictive.

Those skilled in the art should understand that unless otherwise indicated in the context, they should be understood as "one or more".

The names of messages or information exchanged between multiple devices in the present disclosure are for illustrative purposes only and are not intended to limit the scope of these messages or information.

In the following embodiments, each embodiment simultaneously provides alternative features and examples, a plurality of features described in the embodiment may be combined to form a plurality of alternative embodiments, each numbered embodiment should not be regarded as only one technical solution.

Embodiment I

FIG. 1 is a flowchart of a method of interaction according to embodiments I of the present disclosure. The method is applicable to the situation where a plurality of users are capturing interactively in real time in an application. The method may be performed by an apparatus for interaction which can be implemented by software and/or hardware and generally integrated on an electronic device. In the context of the present embodiment, the electronic device comprises mobile phones, personal digital assistants and computers and other devices.

As shown in FIG. 1, embodiment I of the present disclosure provides a method of interaction, comprising:

S110: display an interaction interface after a user selects an interactive object via a selection interface and the interactive object receives an interaction invitation.

The selection interface can be an interface for the user to select an interactive object. The interactive object can be an interactive object selected by the user from a plurality of interactive objects with whom the user is to capturing interactively.

The selection interface includes a plurality of objects to be interacted with. Here an object to be interacted with can be considered as an object to be selected by the user for interaction. An object to be interacted with can be a user's friend or a target user recommended by a system. No limitation as to the target users is suggested herein. The system can randomly recommend a target user or recommend, based on user tags used by the user while using the application, a target user corresponding to the user tags. There a user tag can represent the user's classification within the application. No limitation as to the approaches for classification is suggested herein. Example user tags include a music lover, a film/television lover, a makeup lover, an adventure lover, etc.

The present embodiment is not limited to the mode of triggering the selection interface. For example, the selection interface can be displayed after a capturing control is triggered. Alternatively, it can be triggered after receiving a non-contact instruction. A non-contact instruction can be a voice command, or a non-contact command triggered by a gesture. No limitation is suggested in this regard.

The capturing control can be included in different interfaces of the application. The position of the capturing control is not limited herein. For example, it can be provided in a video capturing interface, a video display interface, or a prop selection interface. Embodiments of the present disclosure are not limited in this regard.

The video capturing interface can be regarded as an interface for capturing videos such as short videos. The video display interface can be regarded as an interface for displaying videos. Users of the application can browse videos via the video display interface. The prop selection interface can be regarded as an interface for selecting props, where the props can be regarded as virtual objects used for video capturing within the application.

Figure 1A:
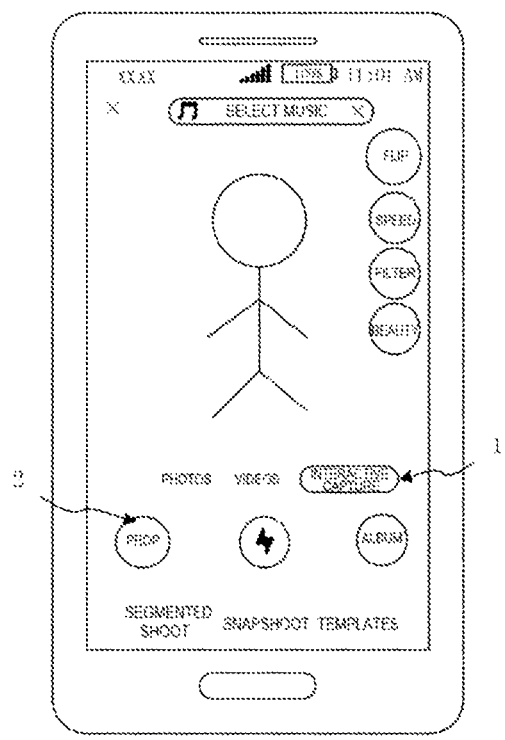
FIG. 1a is a schematic diagram of a video capturing interface according to an embodiment of the present disclosure.

FIG. 1a is a schematic diagram of a video capturing interface according to embodiment I of the present disclosure. As shown in FIG. 1a, the video capturing interface includes a capturing control 1. A selection interface will be entered after the capturing control 1 is triggered. The capturing control in the video capturing interface can also be provided in the prop selection interface. The prop selection interface can be displayed after the prop control 2 is triggered.

For example, the user selects a prop in the prop selection interface, invites the interactive object, and waits for the interactive object to receive the invitation. After the interactive object receives the invitation, the interaction begins, and the entire interaction can be recorded. After the interaction is completed, it can be edited, posted and saved as the user's post on the user's personal homepage, or displayed in the application. Considering an example where the interactive scenario is a card game, both players of the game can select cards for each other, and the content of the card can be random. When selecting a card, the content of the card can be known or unknown to both players of the game. After both players have selected a card, the card is flipped open, presenting the corresponding function of the selected card and applying a corresponding special effect on both sides.

After the interaction or recording is completed, both parties can request one another to confirm whether the recorded content can be posted as a post. If both parties agree, it is possible to jump to an editing interface for editing. After the editing is completed, it can be posted.

During real-time shoot, a plurality of uses can capturing in real time by video chat function and instant audio/video communication technologies, and the recording can be done by audio/video recording functions. Functions and technologies are not limited herein.

Figure 1B:
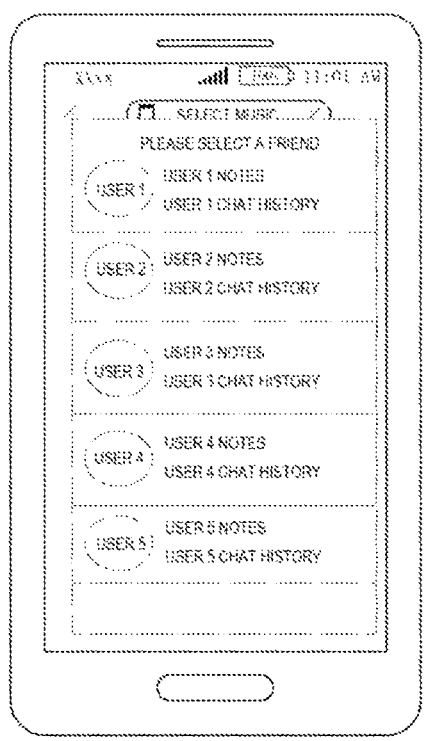
FIG. 1b is a schematic diagram of a selection interface according to embodiment I of the present disclosure.

FIG. 1b is a schematic diagram of a selection interface according to embodiment I of the present disclosure. As shown, the user can select an interactive object via the selection interface, the selection interface may include a list of objects to be interacted with, and the user can select an interactive object.

In the present embodiment, the interaction interface may be an interface that displays pictures taken by the user and the interactive object in real time. The interaction interface includes an interaction control(s). The at least one interaction control is used for interaction between the user and the selected interactive object during the real-time shoot. The interaction controls can be shared by the user and the interactive object or dedicated to the user or the interactive object.

This disclosure does not limit the display position of the pictures taken captured by the user and the interactive object in real time within the interaction interface. Different interactive contents can correspond to different display positions. Interaction controls can be used interactively by users and interactive objects during the interactive capturing to improve the richness of interactive shoot. The functions of interaction controls are not limited here, and different interaction controls can be used for different interactive scenes. This disclosure does not suggest any limitation as the interactive scenes, which can be any scene in the form of real-time interaction among users in the short video creation.

For example, when a user and an interactive object play a game via the interaction interface, the interaction control can be a game control, and different game content can correspond to different controls.

Taking card games as an example, different cards can correspond to different special effects or tasks (tasks to be completed by users or interactive objects), and corresponding interaction controls can be in the form of card controls.

As another example, when singing together, interaction controls can be used to select songs for choir.

As one implementation, each interaction control is used to add a special effect to the other party, and each interaction control is operated by the user and the selected interactive object. As another implementation, the interaction control includes a first interaction control operated by the user and a second interaction control operated by the selected interactive object. In this implementation, the display position of the interaction control in the interaction interface is not limited.

The first and second interaction controls are only used to distinguish different objects and are not actually limited. The control functions of the first and second interaction controls can be the same or different, and the embodiments of the present disclosure are not limited in this regard.

After the user selects the interactive object in the selection interface, the electronic device can send an interaction invitation to the application of the interactive object. After the interactive object receives the interaction invitation, the electronic device can display the interaction interface. No suggestion is suggested as to the technical means of sending and receiving the interaction invitations. For example, the interaction invitation can be a request command. After receiving the request command, the application of the interactive object can prompt the interactive object in the form of a notification. After the interactive object triggers the "agree" control, the interactive object can be represented to receive the interaction invitation.

In an embodiment, the electronic device on the interactive object's side may display an invitation interface, the invitation interface can indicate that the interactive object is now invited for real-time shoot. After the "agree" control is triggered within the invitation interface, the interactive object receives the user's invitation and may display the interaction interface.

The electronic device on the interactive object's side can display an interaction interface, which includes pictures taken in real-time capturing by the user and the interactive object and interaction control(s). After the real-time capturing is completed, the real-time capturing content can be recorded as the target content. The target content can be stored in a list of posts of the interactive object. The interactive object's side can display an interaction interface, which includes an interaction control(s) for interaction between the user and the interactive object during real-time shoot. The electronic device on the interactive object's side can obtain a setting operation for the interaction control (which can be a setting operation for the interaction control by the electronic device on the user side or a setting operation for the interaction control by the electronic device on the interactive object's side); and respond to the setting operation in the interaction interface.

The electronic device on the interactive object's side can obtain the setting operation for interaction control by the interactive object in the interaction interface. The number of the interaction controls is at least one, each interaction control is used to add a special effect to the other party, and each interaction control is operated by the user and the interactive object. Alternatively, the interaction control includes a first interaction control operated by the user and a second interaction control operated by the interactive object.

Each interaction control used to add special effects to the other party can be considered in the way that after the setting operation for an interaction control by the operator of the interaction control, the corresponding characters of the operated interaction control can be added to the other party. If the operator is a user, the other party is the interactive object. If the operator is an interactive object, the other party is the user.

The selection interface and the interaction interface are video capturing related interfaces. A video capturing related interface is an interface related to the interactive video shoot, and the interactive video is a video which is captured when the user and the interactive object interact based on the interaction interface.

The interface related to video capturing can be considered as the interface displayed during the process of interactive video shoot, such as the selection interface for selecting interactive objects and the interaction interface for users to interact with interactive objects. Interactive videos can record the process of interaction between the user and the interactive object. After authorization by the user and the interactive object, the interactive video can be saved in the user or interactive object's list of posts and can also be edited and posted as a post within the application.

S120: obtain a setting operation for the interaction control.

Different interaction controls can correspond to different operation modes. After the interaction control is set, it can be considered triggered. The setting operation is not limited here, and different interactive scenarios can correspond to different setting operations. For example, the setting operation can be a click operation.

Taking card games as an example, the setting operation for the interaction control can be the clicking operation of the interaction control.

In the present embodiment, obtaining the setting operation for the interaction control can comprise obtaining a setting operation for the interaction control by the user, or obtaining the setting operation for the interaction control by interactive object sent by the electronic device used by the interactive object.

S130: in response to the setting operation within the interaction interface.

In the present embodiment, after obtaining the setting operation for the interaction control by the user and/or interactive object, a response to the setting operation is made, i.e., the operation corresponding to the control function is performed.

In different interaction scenarios, different interaction controls correspond to different functions, and the corresponding technical means for the response are different as well.

In the example of the card game, responding to the setting operation comprise applying a special effect corresponding to the selected card to the other party.

In the example of choir, different interaction controls can correspond to different songs, and by responding to the setting operation, a song corresponding to the selected interaction control can be played.

Embodiment I of the present disclosure provides a method for interaction, comprising: first, displaying an interaction interface after a user selects an interactive object via a selection interface and the interactive object receives an interaction invitation, wherein the interaction interface is configured to display pictures taken by the user and the interactive object in real time, the interaction interface comprises an interaction control for the user and the interactive object to interact while capturing in real time, the selection interface and the interaction interface are video capturing related interfaces, the video capturing related interfaces are related to capturing of an interactive video, and the interactive video is a video which is taken while the user and the interactive object interacts based on the interaction interface; then obtaining a setting operation for the interaction control; and finally responding to the setting operation in the interaction interface. With the above method, real-time interactive capturing among users in the application is realized via the interaction interface, and the interaction control improves the interactivity of users in the application during real-time shoot, allowing users to experience the effect of simultaneous interactive capturing by a plurality of devices.

On the basis of the above embodiment, variants are proposed. In order to make the description brief, only the differences from the above embodiment will be described in the variant embodiments.

In an embodiment, after the user selects an interactive object via the selection interface, and before the selected interactive object receives an interaction invitation, a connection waiting interface is displayed.

The waiting connection interface can refer to an interface that waits for the selected interactive object to receive the interaction invitation.

For example, an interaction control(s) is displayed in the waiting connection interface, so that the user can understand the interaction scene while waiting for the interactive object to receive the invitation, thereby saving interaction time during interactive capturing and fully utilizing the user's waiting time for the interactive object to receive the invitation.

The user can operate the interaction control while waiting for the connection interface. After the setting operation is performed on the interaction control which is operated by the user on the waiting connection interface, it is possible to make no response, or the response can be made after the pictures of the real-time capturing by the interactive object is displayed on the interaction interface.

Figure 1C:
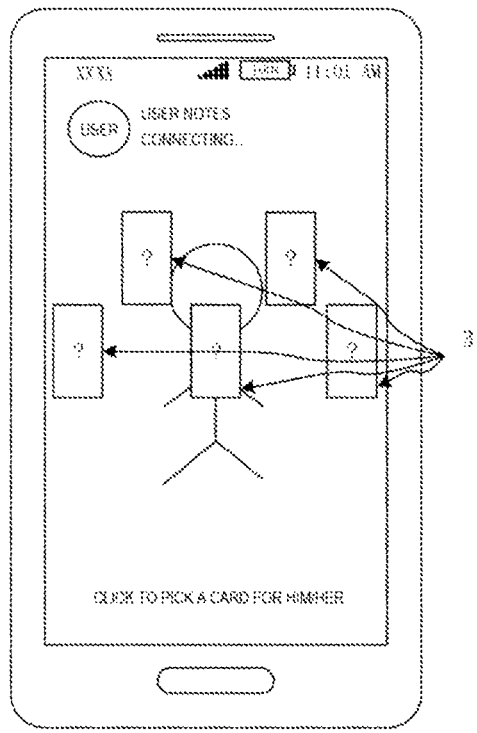
FIG. 1c is a schematic diagram of a display waiting connection interface according to embodiment I of the present disclosure.

FIG. 1c is a schematic diagram of a display of the waiting connection interface according to embodiment I of the present disclosure. As shown, the waiting connection interface includes a plurality of interaction controls 3. In the present disclosure, the user's note can be the user's nickname, without suggesting any limitations in this regard.

After the user selects the interactive object via the selection interface and the interactive object receives the interaction invitation, it will enter the interaction interface. It is also possible to record the interaction interface after entering the interaction interface.

According to the present disclosure, the recording can be triggered automatically or after the user or interactive object clicks a recording control. This disclosure does not limit the timing of the automatic triggering of the recording. For example, the recording can be automatically triggered when the interaction interface is displayed, and interactive videos can be obtained after recording.

In an embodiment, obtaining the setting operation for the interaction control can obtain the setting operation for the interaction control by the user in the interaction interface, or obtain the setting operation for the interaction control in the interface waiting for the connection.

Figure 1D:
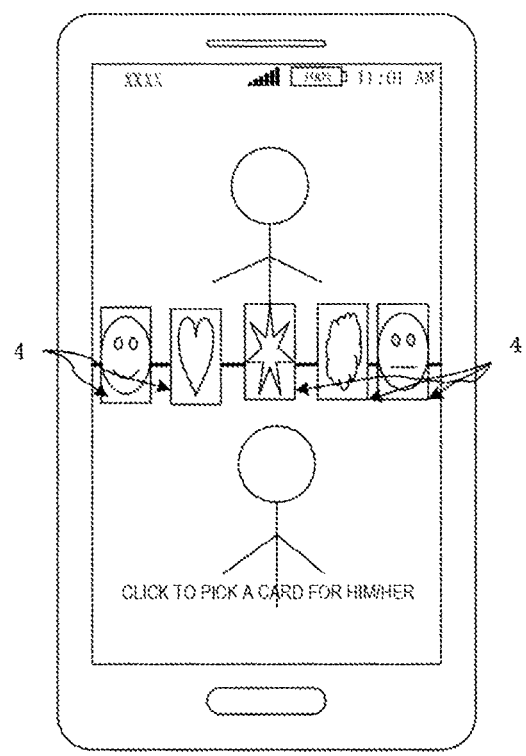
FIG. 1d is a schematic diagram of an interaction interface according to embodiment I of the present disclosure.

FIG. 1d is a schematic diagram of an interaction interface according to embodiment I of the present disclosure. As shown, the interaction interface may display pictures of real-time interaction between the user and the selected interactive object. The interaction interface includes a plurality of interaction controls 4 for the user and the selected interactive object to interact. The interaction control 4 as shown may be shared by the user and the interactive object.

Figure 1E:
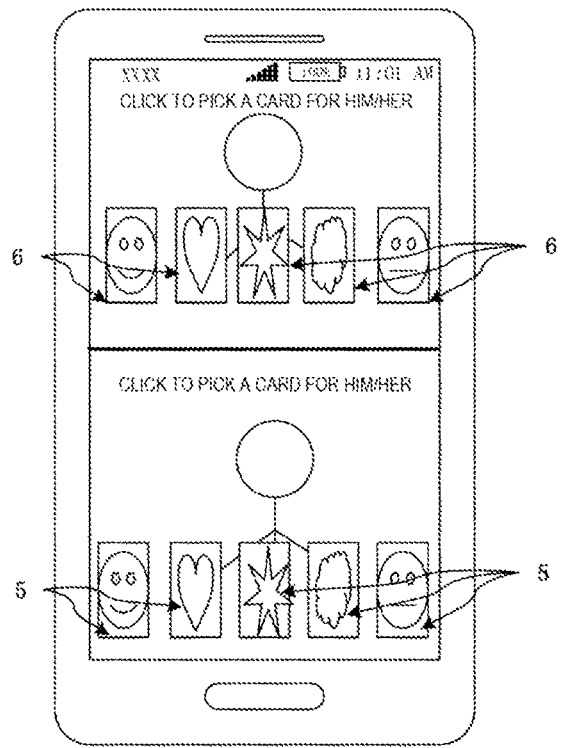
FIG. 1e is a schematic diagram of another interaction interface according to embodiment I of the present disclosure.

FIG. 1e is a schematic diagram of another interaction interface according to embodiment I of the present disclosure. As shown, the interaction interface includes a first interaction control 5 for operations by the user and a second interaction control 6 for operations by the selected interactive object.

Embodiment II

Figure 2:
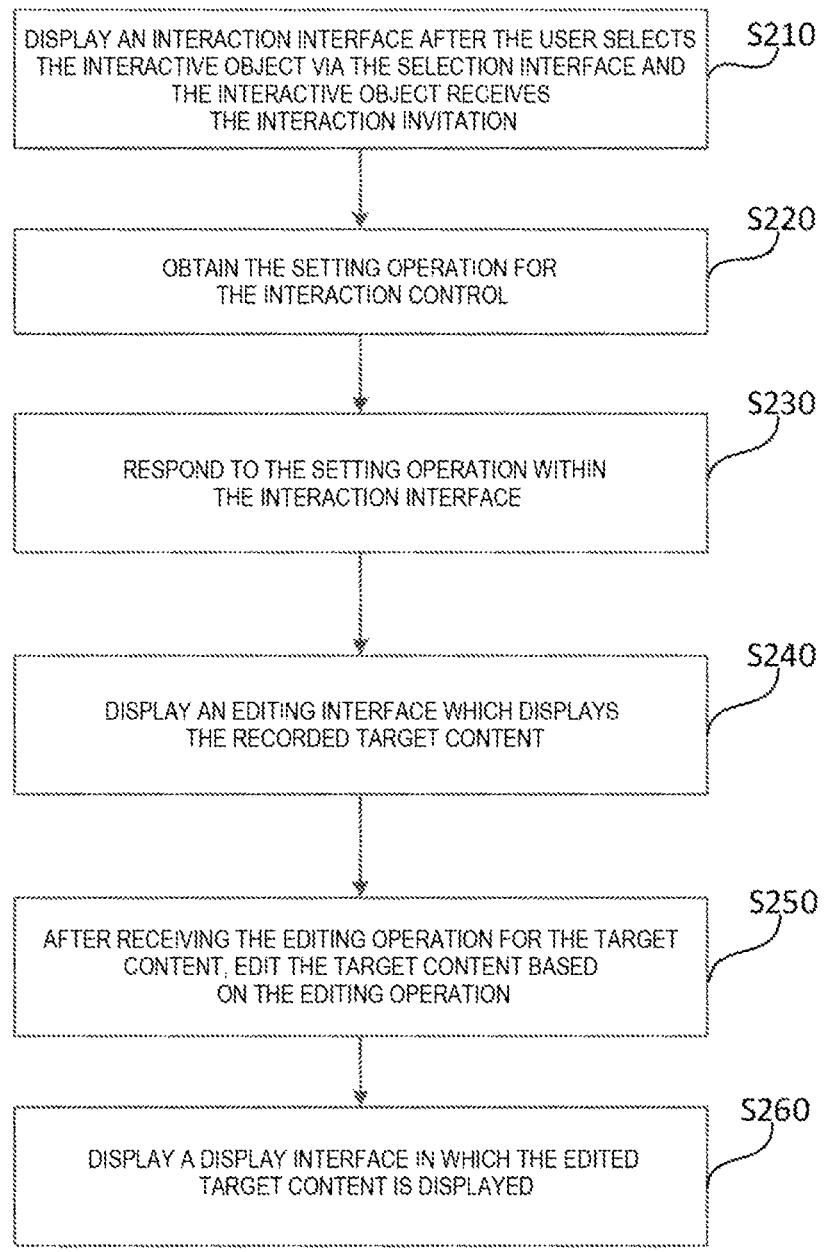
FIG. 2 is a schematic flowchart of a method of interaction according to embodiment II of the present disclosure.

FIG. 2 is a flowchart of a method for interaction according to embodiment II of the present disclosure. Embodiment II will be described on the basis of solutions as described in the above embodiments. In this embodiment, after the recording is completed, it is further comprised displaying an editing interface where the recorded target content is displayed, and after receiving the editing operation for the target content, editing the target content based on the editing operation.

The present embodiment further displays a display interface for the edited target content. The display interface is displayed to further user(s) upon authorization by the user and the interactive object. The further user is a user within the application other than the user and the interactive object.

For the aspects of this embodiment which have not been detailed, please refer to the above embodiments.

As shown in FIG. 2, the method for interaction according to embodiments II of the present disclosure comprises:

S210: display an interaction interface after the user selects the interactive object via the selection interface and the interactive object receives the interaction invitation.

After the capturing control is triggered, the user enters the selection interface, selects the interactive object in the selection interface, and invites the interaction. After the selected interactive object receives the interaction invitation, the interaction interface is displayed. After entering the interaction interface, the user or the interactive object can record the interaction interface.

S220: obtain the setting operation for the interaction control.

S230: respond to the setting operation within the interaction interface.

S240: display an editing interface which displays the recorded target content.

The editing interface can be considered as an interface for performing target content editing. The target content can be the content obtained after recording the interaction interface, such as an interactive video. This embodiment does not limit the ways for triggering the editing interface. For example, it is possible to directly jump to the editing interface after the interaction is completed, or the editing interface can be triggered by operating the editing control by the user. This embodiment suggests no limitation as to the position where the editing control is located as long as the editing interface can be triggered. For example, after the user completes the interactive shoot, a pop-up window can be popped up as a message, indicating that the interactive capturing content has been recorded. The pop-up window can display an editing control(s).

In an embodiment, the duration of the real-time capturing by the user and the interactive object via the interaction interface can be a system default duration. After the default duration expires, the interactive capturing (also referred to as real-time shoot) ends.

In an embodiment, an end control can be provided in the interaction interface. After the end control is triggered, the real-time capturing ends.

S250: after receiving the editing operation for the target content, edit the target content based on the editing operation.

After entering the display editing interface, the user can perform editing operations on the recorded target content. The editing operations are not limited herein, such as beauty, filtering, capturing time, and so on.

After receiving an editing operation for the target content, the electronic device can edit the target content based on the editing operation.

S260: display a display interface in which the edited target content is displayed.

The display interface can be considered as the interface for displaying the edited target content. Other users within the application can browse the display interface.

After editing the target content based on the editing operation, the edited target content can be saved and displayed. The edited target content can be saved as a post on the user's list of posts. Upon being authorized by the user and the interactive object, the edited target content can be displayed to other users in the display interface. Here the other users can be users within the application other than the user and the interactive object, such as any user using the application or on the user's list of friends.

The present embodiment is not limited to the ways for triggering of the display interface. For example, after the interactive object authorizes and the user completes the editing of the target content, the display interface can be automatically displayed.

Authorization by the user and the interactive object is required to either display the edited target content or save it in the application.

When the user saves or post the edited target content by the electronic device, authorization from the interactive object is required. When the interactive object saves or posts the edited target content by the electronic device used by the interactive object, authorization from the user is required.

This embodiment suggests no limitation as to the timing of authorization. For example, a pop-up window can be displayed to the user and/or interactive object at any proper time. The pop-up window may include a control(s) for authorizing or not the posting of the content shot in real time. For example, after completing real-time capturing or before starting real-time shoot, the pop-up window is displayed to determine whether to post the content shot in real time.

In an embodiment, after the user and the interactive object both operate to confirm the post control (i.e., a control for confirming to post real-time shot content), the edited target content will be posted to the application, so that other users can view.

The electronic device on the interactive object's side can display an editing interface and a display interface. Without suggesting any limitations, the contents of the editing interface and the display interface are similar to those of the editing interface and the display interface on the user's side. For the technical means for recording on the interactive object's side, reference can be made to the technical means for recording on the user's side, suggesting any limitations herein. There is no limitation to the content on the interactive object's side.

The electronic device on the interactive object's side can record the interaction interface after or when displaying the interaction interface.

The method for interaction according to embodiment II of the present disclosure comprises displaying an interaction interface after a user selects an interactive object via a selection interface and the interactive object receives an interactive invitation, the interaction interface is configured to display pictures taken by the user and the interactive object in real time, the interaction interface comprises an interaction control for the user and the interactive object to interact while capturing in real time; obtaining a setting operation for the interaction control; editing the target content based on the editing operation after receiving an editing operation for the target content; displaying a display interface where the edited target content is displayed. With this method, real-time interactive capturing by multiple people can be realized, allowing users to experience the fun of interactive capturing by multiple devices at the same time and enhanced user experience.

Embodiment III

Figure 3:
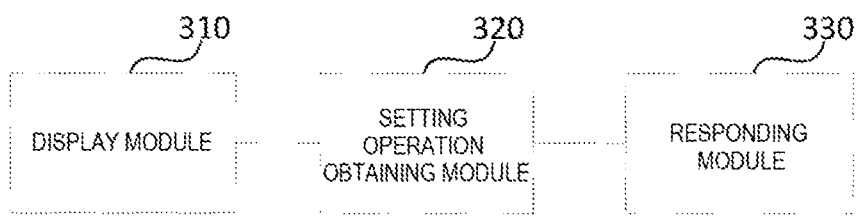
FIG. 3 is a schematic structural diagram of an apparatus for interaction according to embodiment III of the present disclosure.

FIG. 3 is a schematic structural diagram of an apparatus for interaction according to embodiment III of the present disclosure. The apparatus can be applied in the situation of real-time interactive capturing by a plurality of people. The apparatus can be implemented by software and/or hardware and is generally integrated on an electronic device.

As shown, the apparatus comprises: a display module 310 configured to display an interaction interface after a user selects an interactive object via a selection interface and the interactive object receives an interaction invitation, wherein the interaction interface is configured to display pictures taken by the user and the interactive object in real time, the interaction interface comprises an interaction control for the user and the interactive object to interact while capturing in real time, the selection interface and the interaction interface are video capturing related interfaces, the video capturing related interfaces are related to capturing of an interactive video, and the interactive video is a video which is taken while the user and the interactive object interacts based on the interaction interface; a setting operation obtaining module 320 configured to obtain a setting operation for the interaction control; and a responding module 330 configured to respond to the setting operation within the interaction interface.

The apparatus for interaction according to embodiment III of the present disclosure displays an interaction interface after a user selects an interactive object via a selection interface and the interactive object receives an interactive invitation. The interaction interface displays pictures taken or captured by the user and the interactive object in real time. The interaction interface includes an interaction control(s) for interactions between the user and the interactive object while doing the real-time shoot. The selection interface and the interaction interface are video capturing related interfaces. A video capturing related interface is an interface related to the capturing of interactive video. The interactive video is a video that is shot while the user and the interactive object interact based on the interaction interface. A setting operation for the interaction control is obtained. A response to the setting operation is made in the interaction interface. With this method, real-time interactive capturing between users in the application is realized via the interaction interface, and the interactivity of users in the application during the real-time capturing is improved by means of the interaction control.

The selection interface is displayed after the capturing control is triggered.

The capturing control is provided in the video capturing interface, in the video display interface, or in a prop selection interface.

The display module 310 is also configured to, after the user selects the interactive object via the selection interface and prior to the interactive object receives the interaction invitation, display a waiting connection interface in which the interaction control is displayed.

The setting operation obtaining module 320 is configured to obtain the setting operation for the interaction control by the user in the interaction interface or to obtain the setting operation for the interaction control by the user in the waiting connection interface.

There is at least one interaction control, each interaction control is configured to add a special effect to another party, and each interaction control is operated by the user and the interactive object; or the interaction control includes a first interaction control operated by the user and a second interaction control operated by the interactive object.

The apparatus further comprises a recording module configured to record the interaction interface after the user selects the interactive object through the selection interface and the interactive object receives the interaction invitation.

The apparatus further comprises an editing module configured to display an editing interface for displaying the recorded target content and to, after receiving an editing operation for the target content, edit the target content based on the editing operation.

The apparatus further comprises a display module configured to display a display interface for displaying the edited target content. Upon authorization by the user and the interactive object, the display interface is displayed to a further user(s) in the application other than the user and the interactive object.

The apparatus for interaction as described above can perform the method for interaction proposed in any embodiments of the present disclosure and includes the corresponding functional modules and effects of the method.

Embodiment IV

Figure 4:
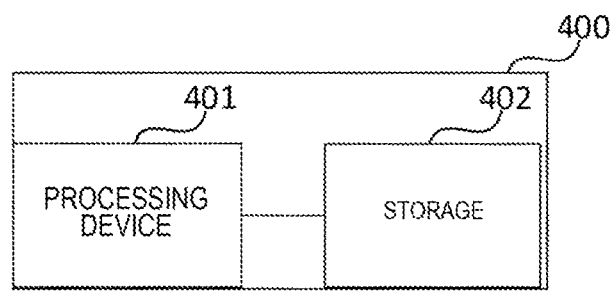
FIG. 4 is a schematic structural diagram of an electronic device according to embodiment IV of the present disclosure.

FIG. 4 is a schematic diagram of the structure of an electronic device according to embodiment IV of the present disclosure. The electronic device 400 as shown in FIG. 4 is suitable for implementing the embodiments of the present disclosure. The electronic device 400 in the embodiments of the present disclosure may include, but not limited to, mobile end points such as mobile phones, laptops, personal digital assistants (PDAs), and tablet computers (Portable Android Devices, PADs), as well as fixed end points such as desktop computers. The electronic device 400 shown in FIG. 4 is only an example and should not bring any limitations on the functionality and scope of use of the embodiments of the present disclosure.

As shown in FIG. 4, the electronic device 400 may include one or more processing devices 401 (e.g., Central Processor graphics processing unit, etc.) and a storage 402. The storage 402 is configured to store one or more programs. The one or more programs, when executed by the one or more processing devices, cause the one or more processing devices to implement the method for interaction as described in embodiments of the present disclosure.

The present disclosure provides a computer-readable medium having a computer program stored thereon. The program, when executed by a processing device, implements the method for interaction as described in the present disclosure.

The computer-readable storage medium may be, but is not limited to, an electrical, magnetic, optical, electromagnetic, infrared, or semiconductor system, apparatus, or device, or any combination thereof.

In this disclosure, a computer-readable storage medium can be any tangible medium containing or storing a program that can be used by or in combination with an instruction execution system, device, or device. In this disclosure, a computer-readable signal medium can include a data signal propagated in baseband or as part of a carrier wave, which carries computer-readable program code. This propagated data signal can take many forms, including but not limited to electromagnetic signals, optical signals, or any suitable combination thereof. A computer-readable signal medium can also be any computer-readable medium other than a computer-readable storage medium, which can send, propagate, or transmit programs for use by or in combination with an instruction execution system, device, or device. The program code contained on a computer-readable medium can be transmitted in any suitable medium, including but not limited to: wires, optical cables, radio frequency (RF), etc., or any suitable combination thereof.

The above-described computer-readable medium may be contained in the electronic device 400; or it may exist alone and not be assembled into the electronic device 400.

The above computer-readable medium stores one or more computer programs, and when the one or more programs are executed by the processing device, the following methods are implemented: when the user selects an interactive object through the selection interface, and the interactive object receives an interaction invitation, an interaction interface is displayed, the interaction interface displays a screen shot in real time by the user and the interactive object, and the interaction interface includes interaction controls for interaction between the user and the interactive object during real-time shoot. The selection interface and the interaction interface are video capturing related interfaces, the video capturing related interface is an interface related to interactive video shoot, and the interactive video is a video shot when the user and the interactive object interact based on the interaction interface; obtaining a setting operation for the interaction control; responding to the setting operation in the interaction interface.

The computer-readable medium carries one or more programs that, when executed by the electronic device 400, cause the electronic device 400 to: write computer program code for performing the operations of the present disclosure in one or more programming languages, or combinations thereof, including Object Oriented programming languages such as Java, Smalltalk, C++, and conventional procedural programming languages such as "C" or similar programming languages. The program code may be executed entirely on the user's computer, partially on the user's computer, as a separate software package, partially on the user's computer, partially on a remote computer, or entirely on a remote computer or server. In the case of a remote computer, the remote computer may be connected to the user's computer via any type of network, including a local area network (LAN) or a wide area network (WAN), or may be connected to an external computer (e.g., using an Internet service provider to connect via the Internet).

The flowcharts and block diagrams in the accompanying drawings illustrate the architecture, functions, and operations of the systems, methods, and computer program products that may be implemented in accordance with various embodiments of the present disclosure. Each block in the flowcharts or block diagrams may represent a module, program segment, or portion of code that contains one or more executable instructions for implementing the specified logical functions. In some alternative implementations, the functions marked in the blocks may also occur in a different order than those marked in the figures. For example, two consecutive blocks may actually be executed in substantially parallel, and they may sometimes be executed in the opposite order, depending on the functions involved. It should also be noted that each block in the block diagrams and/or flowcharts, as well as combinations of blocks in the block diagrams and/or flowcharts, may be implemented using a dedicated hardware-based system that performs the specified functions or operations, or may be implemented using a combination of dedicated hardware and computer instructions.

The modules described in the embodiments of the present disclosure can be implemented in software or hardware. The name of the module does not limit the module itself in one case.

The functions described above in this article can be at least partially performed by one or more hardware logic components. For example, without limitation, example types of hardware logic components that can be used include: Field Programmable Gate Array (FPGA), Application Specific Integrated Circuit (ASIC), Application Specific Standard Parts (ASSP), System on Chip (SOC), Complex Programmable Logic Device (CPLD), and so on.

In the context of this disclosure, a machine-readable medium can be a tangible medium that can contain or store programs for use by or in conjunction with an instruction execution system, device, or device. A machine-readable medium can be a machine-readable signal medium or a machine-readable storage medium. Machine-readable media can include, but are not limited to, electronic, magnetic, optical, electromagnetic, infrared, or semiconductor systems, devices, or devices, or any suitable combination thereof. Examples of machine-readable storage media may include electrical connections based on one or more wires, portable computer disks, hard disks, random access memory (RAM), read-only memory (ROM), erasable programmable read-only memory (EPROM or flash memory), optical fibers, compact disc read-only memory (CD-ROM), optical storage devices, magnetic storage devices, or any suitable combination thereof.

According to one or more embodiments of the present disclosure, Example 1 provides a method of interaction for an application, comprising: displaying an interaction interface after a user selects an interactive object via a selection interface and the interactive object receives an interaction invitation, wherein the interaction interface is configured to display pictures taken by the user and the interactive object in real time, the interaction interface comprises an interaction control for the user and the interactive object to interact while capturing in real time, the selection interface and the interaction interface are video capturing related interfaces, the video capturing related interfaces are related to capturing of an interactive video, and the interactive video is a video which is taken while the user and the interactive object interacts based on the interaction interface; obtaining a setting operation for the interaction control; and responding to the setting operation within the interaction interface.

According to one or more embodiments of the present disclosure, Example 2 provides a method of Example 1, wherein the selection interface is displayed after a capturing control is triggered.

According to one or more embodiments of the present disclosure, Example 3 provides a method of Example 2, wherein the capturing control is within a video capturing interface; or the capturing control is within a video display interface; or the capturing control is within a prop selection interface.

According to one or more embodiments of the present disclosure, Example 4 provides a method of Example 1, after the user selects the interactive object via the selection interface and prior to the interactive object receives the interaction invitation, further comprising: displaying a waiting connection interface, wherein the interaction control is displayed in the waiting connection interface.

According to one or more embodiments of the present disclosure, Example 5 provides a method of Example 4, wherein the obtaining a setting operation for the interaction control comprises: obtaining the setting operation for the interaction control by the user in the interaction interface; or obtaining the setting operation for the interaction control by the user within the waiting connection interface.

According to one or more embodiments of the present disclosure, Example 6 provides a method of Example 1, wherein the interaction interface comprises at least one interaction control, each interaction control is configured to add a special effect to another party, and each interaction control is operated by the user and the interactive object; or the interaction control comprises a first interaction control operated by the user and a second interaction control operated by the interactive object.

According to one or more embodiments of the present disclosure, Example 7 provides a method of Example 1, after the user selects the interactive object via the selection interface and the interactive object receives the interaction invitation, further comprising: recording the interaction interface.

According to one or more embodiments of the present disclosure, Example 8 provides a method of Example 7, further comprising: displaying an editing interface, wherein a recorded target content is displayed in the editing interface display; and in response to receiving an editing operation for the target content, editing the target content based on the editing operation.

According to one or more embodiments of the present disclosure, Example 9 provides a method of Example 8, further comprising: display a display interface, wherein the display interface displays the edited target content, and the display interface is displayed to a further user upon authorization by the user and the interactive object, and the further user is a user within the application other than the user and the interactive object.

According to one or more embodiments of the present disclosure, Example 10 provides an apparatus for interaction, comprising: a display module configured to display an interaction interface after a user selects an interactive object via a selection interface and the interactive object receives an interaction invitation, wherein the interaction interface is configured to display pictures taken by the user and the interactive object in real time, the interaction interface comprises an interaction control for the user and the interactive object to interact while capturing in real time, the selection interface and the interaction interface are video capturing related interfaces, the video capturing related interfaces are related to capturing of an interactive video, and the interactive video is a video which is taken while the user and the interactive object interacts based on the interaction interface; a setting operation obtaining module configured to obtain a setting operation for the interaction control; and a responding module configured to respond to the setting operation within the interaction interface.

According to one or more embodiments of the present disclosure, Example 11 provides an electronic device, comprising: one or more processing devices; and a storage configured to store one or more programs, the program, when executed by the at least one processing device, causing the at least one processing device to implement the method of interaction of any of Examples 1-9.

According to one or more embodiments of the present disclosure, Example 12 provides a computer-readable medium having a computer program stored thereon, the program, when executed by a processing device, implements the method according to any of Examples 1-9.

In addition, although multiple operations are depicted in a specific order, this should not be understood as requiring these operations to be executed in the specific order shown or in sequential order. In certain environments, multitasking and parallel processing may be advantageous. Similarly, although multiple implementation details are included in the above discussion, these should not be construed as limiting the scope of the present disclosure. Some features described in the context of individual embodiments can also be combined to implement in a single embodiment. Conversely, multiple features described in the context of a single embodiment can also be implemented separately or in any suitable sub-combination in multiple embodiments.

We claim:

1. A method of interaction for an application, comprising:
   displaying a waiting connection interface after a user selects an interactive object via a selection interface, wherein the selection interface is a video capturing related interface, the video capturing related interface is related to capturing of an interactive video, and the waiting connection interface comprises at least one interaction control for the user and the interactive object to interact while capturing in real time;
   displaying an interaction interface after the interactive object receives an interaction invitation, wherein the interaction interface is configured to display pictures captured by the user and the interactive object in real time, the interaction interface comprises the at least one interaction control, the interaction interface is another video capturing related interface which is related to the capturing of the interactive video, and the interactive video is a video which is captured while the user and the interactive object interacts based on the interaction interface;
   obtaining a setting operation for a first interaction control of the at least one interaction control within the waiting connection interface or in the interaction interface, wherein the first interaction control is configured to be operated by the user to add an effect to the interactive object;
   responding to the setting operation within the interaction interface;
   recording the interaction interface;
   displaying an editing interface, wherein a recorded target content is displayed in the editing interface;
   in response to receiving an editing operation for the target content, editing the target content based on the editing operation;
   saving the edited target content; and
   posting the edited target content as a post of the user on a personal homepage of the user.

2. The method of claim 1, wherein the interaction interface comprises at least one interaction control further includes a second interaction control configured to be operated by the interactive object to add an effect to the user.

3. The method of claim 1, further comprising:
   displaying a display interface, wherein the display interface displays the edited target content, and the display interface is displayed to a further user upon authorization by the user and the interactive object, and the further user is a user within the application other than the user and the interactive object.

4. The method of claim 1, after the user posts the edited target content as a post of the user on a personal homepage of the user, further comprising:
   displaying the edited target content in the application.

5. The method of claim 1, wherein the selection interface is displayed after a capturing control is triggered.

6. The method of claim 5, wherein the capturing control is within a video capturing interface; or the capturing control is within a video display interface; or the capturing control is within a prop selection interface.

7. An electronic device comprising:
   at least one processing unit; and
   a storage configured to store a program, the program, when executed by the at least one processing device, causing the at least one processing unit to perform acts comprising:
   displaying a waiting connection interface after a user selects an interactive object via a selection interface, wherein the selection interface is a video capturing related interface, the video capturing related interface is related to capturing of an interactive video, and the waiting connection interface comprises at least one interaction control for the user and the interactive object to interact while capturing in real time;
   displaying an interaction interface after the interactive object receives an interaction invitation, wherein the interaction interface is configured to display pictures captured by the user and the interactive object in real time, the interaction interface comprises the at least one interaction control, the interaction interface is another video capturing related interface which is related to the capturing of the interactive video, and the interactive video is a video which is captured while the user and the interactive object interacts based on the interaction interface;
   obtaining a setting operation for a first interaction control of the at least one interaction control within the waiting connection interface or in the interaction interface, wherein the first interaction control is configured to be operated by the user to add an effect to the interactive object;
   responding to the setting operation within the interaction interface;
   recording the interaction interface;
   displaying an editing interface, wherein a recorded target content is displayed in the editing interface;
   in response to receiving an editing operation for the target content, editing the target content based on the editing operation;
   saving the edited target content; and
   posting the edited target content as a post of the user on a personal homepage of the user.

8. The electronic device of claim 7, wherein the interaction interface comprises at least one interaction control further includes a second interaction control configured to be operated by the interactive object to add an effect to the user.

9. The electronic device of claim 7, the acts further comprising:

displaying a display interface, wherein the display interface displays the edited target content, and the display interface is displayed to a further user upon authorization by the user and the interactive object, and the further user is a user within the application other than the user and the interactive object.

10. The method of claim 7, after the user posts the edited target content as a post of the user on a personal homepage of the user, further comprising:

displaying the edited target content in the application.

11. The electronic device of claim 7, wherein the selection interface is displayed after a capturing control is triggered.

12. The electronic device of claim 11, wherein the capturing control is within a video capturing interface; or the capturing control is within a video display interface; or the capturing control is within a prop selection interface.

13. A non-transitory computer readable medium storing a computer program that, when executed by a processing unit, performs acts comprising:

displaying a waiting connection interface after a user selects an interactive object via a selection interface, wherein the selection interface is a video capturing related interface, the video capturing related interface is related to capturing of an interactive video, and the waiting connection interface comprises at least one interaction control for the user and the interactive object to interact while capturing in real time;

displaying an interaction interface after the interactive object receives an interaction invitation, wherein the interaction interface is configured to display pictures captured by the user and the interactive object in real time, the interaction interface comprises the at least one interaction control, the interaction interface is another video capturing related interface which is related to the capturing of the interactive video, and the interactive video is a video which is captured while the user and the interactive object interacts based on the interaction interface;

obtaining a setting operation for a first interaction control of the at least one interaction control within the waiting connection interface or in the interaction interface, wherein the first interaction control is configured to be operated by the user to add an effect to the interactive object;

responding to the setting operation within the interaction interface;

recording the interaction interface;

displaying an editing interface, wherein a recorded target content is displayed in the editing interface;

in response to receiving an editing operation for the target content, editing the target content based on the editing operation;

saving the edited target content; and posting the edited target content as a post of the user on a personal homepage of the user.

\* \* \* \* \*